United States Patent
Kubo et al.

(10) Patent No.: US 10,794,278 B2
(45) Date of Patent: Oct. 6, 2020

(54) COMPRESSED AIR STORAGE POWER GENERATION DEVICE

(71) Applicant: Kobe Steel, Ltd., Hyogo (JP)

(72) Inventors: Yohei Kubo, Kobe (JP); Masatake Toshima, Kobe (JP); Hiroki Saruta, Takasago (JP); Masaki Matsukuma, Takasago (JP); Kanami Sakamoto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 79 days.

(21) Appl. No.: 16/080,502

(22) PCT Filed: Feb. 10, 2017

(86) PCT No.: PCT/JP2017/004900
§ 371 (c)(1),
(2) Date: Aug. 28, 2018

(87) PCT Pub. No.: WO2017/154459
PCT Pub. Date: Sep. 14, 2017

(65) Prior Publication Data
US 2020/0063658 A1 Feb. 27, 2020

(30) Foreign Application Priority Data
Mar. 10, 2016 (JP) .................. 2016-046931

(51) Int. Cl.
*F02C 6/16* (2006.01)
*F01D 25/18* (2006.01)
(Continued)

(52) U.S. Cl.
CPC ........... *F02C 6/16* (2013.01); *F01D 25/18* (2013.01); *F02C 1/06* (2013.01); *F02C 7/143* (2013.01); *F02C 9/00* (2013.01); *F05D 2260/213* (2013.01)

(58) Field of Classification Search
CPC ..... F01K 27/02; F01K 7/16; F01K 3/18; F02C 6/16; F02C 1/02; H02J 15/006
See application file for complete search history.

(56) References Cited

U.S. PATENT DOCUMENTS 4,347,706 A * 9/1982 Drost .................. F01K 3/00
290/52
5,263,832 A * 11/1993 Yamaguchi ........... F04C 29/04
418/83
(Continued)

FOREIGN PATENT DOCUMENTS

EP 2 516 827 A2 10/2012
JP 2013-509530 A 3/2013
(Continued)

OTHER PUBLICATIONS

The extended European search report issued by the European Patent Office dated Oct. 2, 2019, which corresponds to European Patent Application No. 17762803.9 and is related to U.S. Appl. No. 16/080,502.
(Continued)

*Primary Examiner* — Shafiq Mian
(74) *Attorney, Agent, or Firm* — Studebaker & Brackett PC

(57) ABSTRACT

The compressed air energy storage power generation device includes a third heat exchanger and fourth heat exchangers. The third heat exchanger performs heat exchange between the air exhausted from the expander and the second heating medium to cool the second heating medium. The fourth heat exchanger performs heat exchange between the second heating medium cooled by the third heat exchanger and at least one of the lubricating oil to be supplied to the compressor or the first heating medium to be supplied to the first heat exchanger to cool the lubricating oil or the first heating medium.

16 Claims, 8 Drawing Sheets

(51) Int. Cl.
*F02C 1/06* (2006.01)
*F02C 7/143* (2006.01)
*F02C 9/00* (2006.01)

(56) References Cited

U.S. PATENT DOCUMENTS

| | | | | |
|---|---|---|---|---|
| 2005/0235625 A1* | 10/2005 | Gericke | ............... | F01K 7/40 60/39.182 |
| 2011/0094212 A1* | 4/2011 | Ast | ............... | F02C 1/02 60/327 |
| 2011/0094236 A1* | 4/2011 | Finkenrath | ............... | H02J 15/006 60/772 |
| 2011/0100010 A1 | 5/2011 | Freund et al. | | |
| 2017/0234171 A1* | 8/2017 | Matsukuma | ............... | F01K 27/02 60/659 |
| 2018/0238196 A1* | 8/2018 | Kavehpour | ............... | F01K 23/06 |

FOREIGN PATENT DOCUMENTS

| | | |
|---|---|---|
| WO | 2011/076926 A2 | 6/2011 |
| WO | 2016/031821 A1 | 3/2016 |
| WO | WO-2016031821 A1 * | 3/2016 ............... F01K 3/18 |

OTHER PUBLICATIONS

International Preliminary Report on Patentability issued in corresponding International Application No. PCT/JP2017/004900; dated Sep. 20, 2018; with English translation.
International Search Report issued in PCT/JP2017/004900, dated Mar. 7, 2017.

* cited by examiner

COMPRESSED AIR STORAGE POWER GENERATION DEVICE

CROSS-REFERENCE TO RELATED APPLICATIONS

This is a national phase application in the United States of International Patent Application No. PCT/JP2017/004900 with an international filing date of Feb. 10, 2017, which claims priority of Japanese Patent Application No. 2016-046931 filed on Mar. 10, 2016 the contents of which are incorporated herein by reference.

TECHNICAL FIELD

The present invention relates to a compressed air energy storage power generation device.

BACKGROUND ART

Since power generation using renewable energy such as wind power generation and photovoltaic power generation depends on weather conditions, the output fluctuates and is not stabilized in some cases. Against such output fluctuations, a compressed air energy storage (CAES) system is known to serve as a system for leveling the output.

The compressed air energy storage (CAES) power generation device using this CAES system stores electric energy as compressed air in the pressure accumulator tank during the off-peak time of the power plant, and drives the expander with the compressed air during the high power demand time to operate the generator to generate electric energy to level the output. In addition, in order to improve power generation efficiency, a system is known, which recovers compressed heat in a heat storage medium to store the compressed heat in a heat storage tank or the like, and heats the compressed air before expansion by using the recovered compression heat. Thus, the system, which prevents power increase during compression, increases recovery power during expansion and prevents heat release during storage of the pressure accumulator tank at the same time.

As such a CAES power generation device, for example, JP 2013-509530 A discloses a system using a heat energy storage system.

PRIOR ART DOCUMENT

Patent Document

Patent Document 1: JP 2013-509530 A

SUMMARY OF THE INVENTION

Problems to be Solved by the Invention

From the viewpoint of operation efficiency, it is necessary for the CAES power generation device to cool the compressor and the compressed air discharged from the compressor. Although JP 2013-509530 A does not describe such cooling in detail, an external cooling device such as a cooling tower is often used for such cooling from the viewpoint of convenience of cooling and the like. In that case, the degree of freedom of the installation location of the CAES power generation device is limited because the CAES power generation device is connected to the external cooling device. In addition, in the CAES power generation device in JP 2013-509530 A, no special consideration is given to effectively utilizing the cold energy of the air exhausted from the expander.

In the compressed air energy storage power generation device, the present invention recovers cold energy exhausted from an expander to use the cold energy as a cold energy source, and can improve the energy efficiency of the system without supplying cold energy from the outside, that is, without limiting the degree of freedom of the installation location.

Means for Solving the Problems

The compressed air energy storage power generation device of the present invention includes: an electric motor to be driven by electric power generated by renewable energy; a compressor configured to be driven by the electric motor and to compress air; a pressure accumulator configured to store compressed air compressed by the compressor; an expander to be driven by the compressed air to be supplied from the pressure accumulator; a generator mechanically connected to the expander; a first heat exchanger configured to perform heat exchange between the compressed air to be supplied from the compressor to the pressure accumulator and a first heating medium to cool the compressed air and to heat the first heating medium; a first heat storage configured to store the first heating medium heated by the first heat exchanger; a second heat exchanger configured to perform heat exchange between the compressed air to be supplied from the pressure accumulator to the expander and the first heating medium to be supplied from the first heat storage to heat the compressed air and to cool the first heating medium; a third heat exchanger configured to perform heat exchange between air exhausted from the expander and a second heating medium to heat the air and to cool the second heating medium; and a fourth heat exchanger configured to perform heat exchange between the second heating medium cooled by the third heat exchanger and at least one of lubricating oil to be supplied to the compressor and the first heating medium to be supplied to the first heat exchanger to heat the second heating medium and to cool the lubricating oil and/or the first heating medium.

According to the above configuration, since the cold air energy exhausted from the expander is used as the cold energy source, an external cooling device such as a cooling tower is not needed, the compressed air energy storage power generation device of the present invention can be installed independently of the outside, and the degree of freedom of the installation location is not limited. In addition, since the compressed air energy storage power generation device of the present invention recovers the cold energy of the air exhausted from the expander and uses the cold energy to cool the compressor and the compressed air discharged from the compressor, the energy efficiency of the system can be improved.

The compressed air energy storage power generation device preferably further includes a first cold energy storage configured to store the second heating medium cooled by the third heat exchanger.

Since the first cold energy storage is provided, even when it is unable to recover the cold energy to obtain the cooled second heating medium, the cooled second heating medium stored in the first cold energy storage is supplied to the fourth heat exchanger, and the compressor and the compressed air discharged from the compressor can be cooled.

The compressed air energy storage power generation device preferably further includes a second heat storage configured to store the first heating medium cooled by the second heat exchanger, and a second cold energy storage configured to store the second heating medium heated by the fourth heat exchanger.

Since the second heat storage and the second cold energy storage are provided, it is able to store the first heating medium and the second heating medium separately for each temperature, and the first heating medium at a higher temperature and the second heating medium at a lower temperature can be obtained.

The first heating medium and the second heating medium may be identical heating mediums, and the second heat storage and the second cold energy storage may be one heating medium accumulator.

Since the first heating medium and the second heating medium are the same heating medium, the first heating medium and the second heating medium can be mixed to be used. Therefore, the second heat storage and the second cold energy storage can be constituted with one heating medium accumulator, which enables miniaturization and cost reduction.

The compressor may be of a multi-stage type configured to compress air in a plurality of stages, the lubricating oil cooled by the fourth heat exchanger may be supplied to an intermediate stage of the compressor, and the first heat exchanger may be provided to cool intermediate air of the compressed air.

With this configuration, the intermediate stage and the intermediate air of the compressor whose temperature rises due to the compression heat can be cooled, whereby the compression efficiency can be improved. Here, the intermediate stage of the compressor indicates the compressor main body other than the first stage out of a plurality of stages of compressor main bodies, that is, indicates the compressor main body from the second stage to the last stage. In addition, the intermediate air of the compressor indicates compressed air after the first stage compression and before the last stage compression. Since the temperatures of the intermediate stage and the intermediate air of the compressor rise due to the compression heat when the air is compressed in the preceding stage, cooling the intermediate stage and the intermediate air allows the compression efficiency to be improved.

The compressed air energy storage power generation device preferably further includes: a temperature detector configured to detect a temperature of at least one of the lubricating oil to be supplied to the compressor and the first heating medium to be supplied to the first heat exchanger, a switching unit configured to permit or block a flow of the second heating medium to be supplied to the fourth heat exchanger, and a control device configured to switch the switching unit to permit a flow of the second heating medium when a temperature value detected by the temperature detector is not less than a set value, and configured to switch the switching unit to block a flow of the second heating medium when the temperature value is less than the set value.

Since the temperature of the lubricating oil or the first heating medium is detected by the temperature detector, and the switching unit is controlled based on the detected temperature, the lubricating oil or the first heating medium can be adjusted to a temperature set value suitable for operation of the CAES power generation device. Therefore, the temperature of the lubricating oil important for the operation of the compressor and the temperature of the compressed air discharged from the compressor that cools by utilizing the first heating medium can be adjusted to a temperature suitable for operation.

The switching unit preferably includes a flow control valve for adjusting a flow rate of the second heating medium to be supplied to the fourth heat exchanger, and the control device preferably adjusts an opening degree of the flow control valve based on the temperature value detected by the temperature detector.

The flow control valve can optimize the amount of the second heating medium to be supplied for cooling the lubricating oil or the first heating medium. Specifically, when the temperature of the lubricating oil or the first heating medium detected by the temperature detector is significantly higher than the set value, and it is necessary to cool the lubricating oil or the first heating medium more largely in the fourth heat exchanger, the opening degree of the flow control valve is increased and the flow rate of the second heating medium is increased. Thus, the amount of heat exchange in the fourth heat exchanger increases, and the lubricating oil or the first heating medium can be more largely cooled. On the other hand, when the temperature of the lubricating oil or the first heating medium detected by the temperature detector is not so high as compared with the set value, and it is not necessary to cool the lubricating oil or the first heating medium so much in the fourth heat exchanger, the opening degree of the flow control valve is reduced, and the flow rate of the second heating medium is reduced. Thus, the amount of heat exchange decreases, and the amount of the second heating medium used for cooling the lubricating oil or the first heating medium can be reduced.

According to the present invention, in the compressed air energy storage power generation device, the degree of freedom of the installation location is not limited and the energy efficiency of the system can be improved.

MODE FOR CARRYING OUT THE INVENTION

In the following, embodiments of the present invention will be described with reference to the accompanying drawings.

First Embodiment

The compressed air energy storage (CAES) power generation device 2 levels the output fluctuation of a power generation device 4 for generating electricity by using renewable energy to supply electric power to an electric power system 6, and supplies electric power depending on fluctuation in electric power demand in the electric power system 6.

Figure 1:
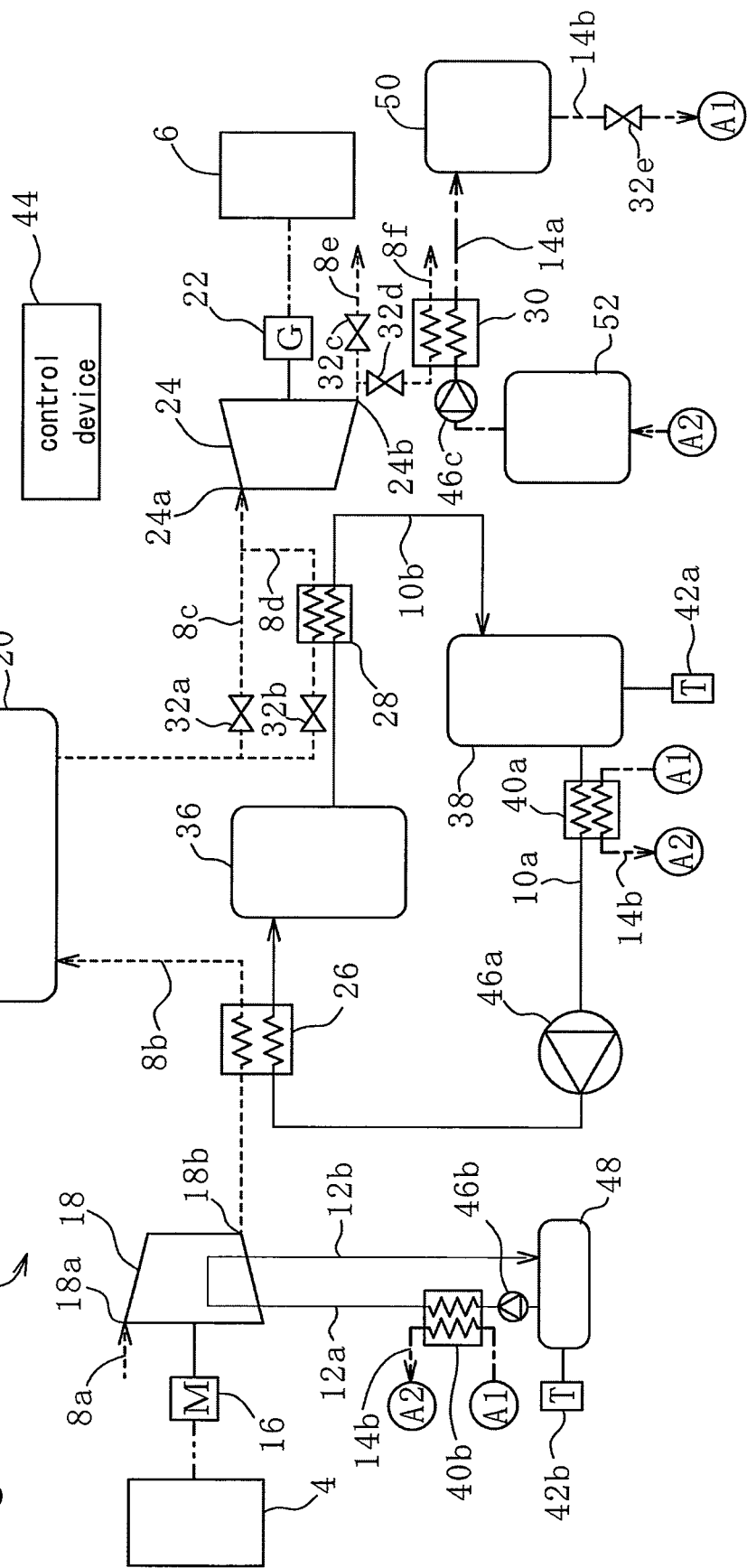
FIG. 1 is a schematic configuration diagram of a compressed air energy storage power generation device according to a first embodiment of the present invention.

With reference to FIG. 1, the configuration of the CAES power generation device 2 will be described. The CAES power generation device 2 of the present embodiment includes air flow paths 8a to 8f (indicated by broken lines), first heating medium flow paths 10a and 10b (indicated by solid lines), lubricating oil flow paths 12a and 12b (indicated by solid lines), and second heating medium flow paths 14a and 14b (indicated by alternate long and short dash lines).

(Air Flow Path)

The air flow paths 8a to 8f are provided with a compressor 18 driven by a motor (electric motor) 16, a pressure accumulator tank (pressure accumulator) 20, an expander 24 for driving a generator 22, a first heat exchanger 26, a second heat exchanger 28, and a third heat exchanger 30.

The power generation device 4 utilizing renewable energy is electrically connected to the motor 16 (indicated by a two-dot chain line). The electric power generated by the power generation device 4 is supplied to the motor 16. The motor 16 is mechanically connected to the compressor 18, and the compressor 18 is driven along with the drive of the motor 16.

When the compressor 18 is driven by the motor 16, the compressor 18 sucks air from the intake port 18a via the air flow path 8a, and compresses the air inside to discharge the compressed air from the discharge port 18b. The discharge port 18b of the compressor 18 is fluidly connected to the pressure accumulator tank 20 through the air flow path 8b, and the compressed air discharged from the discharge port 18b is pressure fed to the pressure accumulator tank 20 through the air flow path 8b. The type of the compressor 18 is not particularly limited, and may be, for example, a screw type, a scroll type, a turbo type, a reciprocating type, or the like.

In the air flow path 8b, a first heat exchanger 26 is interposed as a cooler for compressed air. The compressed air supplied to the first heat exchanger 26 is heated to a high temperature by the compression heat generated during compression. In the first heat exchanger 26, the compressed air is cooled and the first heating medium is heated by heat exchange between the first heating medium and the compressed air.

The pressure accumulator tank 20 can store compressed air to accumulate the compressed air as energy. The pressure accumulator tank 20 is fluidly connected to the expander 24 through the air flow paths 8c and 8d, and the compressed air delivered from the pressure accumulator tank 20 is supplied to the expander 24 through the air flow paths 8c and 8d. Valves 32a and 32b are respectively provided in the air flow paths 8c and 8d, and opening or closing the valves 32a and 32b allows supply of compressed air from the pressure accumulator tank 20 to the expander 24 to be permitted or blocked and which of the air flow paths 8c and 8d the compressed air flows to be selected. The valves 32a and 32b of the present embodiment are included in the switching unit of the present invention.

In addition, among the air flow paths 8c and 8d, the second heat exchanger 28 is interposed in one air flow path 8d, and no heat exchanger is interposed in the other air flow path 8c. In the second heat exchanger 28, the compressed air is heated and the first heating medium is cooled by heat exchange between the first heating medium and the compressed air.

The expander 24 is mechanically connected to the generator 22, and the expander 24 supplied with compressed air from the air supply port 24a operates with the supplied compressed air and drives the generator 22. The generator 22 is electrically connected to the electric power system 6 (indicated by a two-dot chain line), and the electric power generated by the generator 22 is supplied to the electric power system 6. In addition, the air expanded by the expander 24 is exhausted from the exhaust port 24b through the air flow paths 8e and 8f. Valves 32c and 32d are respectively provided in the air flow paths 8e and 8f, and opening or closing the valves 32c and 32d allows exhaust of air from the expander 24 to the outside to be permitted or blocked and which of the air flow paths 8e and 8f the air to be exhausted flows to be selected. The valves 32c and 32d of the present embodiment are included in the switching unit of the present invention. The type of the expander 24 may be, for example, a screw type, a scroll type, a turbo type, a reciprocating type, or the like.

Among the air flow paths 8e and 8f extending from the exhaust port 24b of the expander 24, one air flow path 8f is provided with the third heat exchanger 30 as a cold energy recovery unit, and the other air flow path 8e is provided with no heat exchanger. Since the air supplied to the third heat exchanger 30 has a low temperature due to heat absorption during expansion, in the third heat exchanger 30, the air is heated and the second heating medium is cooled by heat exchange between the second heating medium and the compressed air.

(First Heating Medium Flow Path)

The first heating medium flow paths 10a and 10b are provided with a first heat exchanger 26, a high-temperature heat storage tank (first heat storage) 36, a second heat exchanger 28, a low-temperature heat storage tank (second heat storage) 38, and a fourth heat exchanger 40a in this order. The first heating medium circulates and flows between these. The type of the first heating medium is not particularly limited, and for example, a mineral oil-based heating medium may be used.

In the first heat exchanger 26, the compressed air in the air flow path 8b extending from the compressor 18 to the pressure accumulator tank 20 is heat-exchanged with the first heating medium in the first heating medium flow path 10a extending from the low-temperature heat storage tank 38 to the high-temperature heat storage tank 36. Specifically, the compressed air flowing in the air flow path 8b is at a high temperature due to the compression heat generated during the compression in the compressor 18, and the compressed air is cooled by heat exchange in the first heat exchanger 26. That is, in the first heat exchanger 26, the temperature of the compressed air decreases, and the temperature of the first heating medium rises. The first heat exchanger is fluidly connected to the high-temperature heat storage tank 36 through the first heating medium flow path 10a, and the first heating medium whose temperature is increased is supplied to the high-temperature heat storage tank 36 to be stored.

The high-temperature heat storage tank 36 heats and stores the first heating medium at a high temperature supplied from the first heat exchanger 26. Therefore, it is preferable that the high temperature heat storage tank 36 is thermally insulated. The high-temperature heat storage tank 36 is fluidly connected to the second heat exchanger 28 through the first heating medium flow path 10b, and the first heating medium stored in the high-temperature heat storage tank 36 is supplied to the second heat exchanger 28 through the first heating medium flow path 10b.

In the second heat exchanger 28, the compressed air in the air flow path 8d extending from the pressure accumulator tank 20 to the expander 24 is heat-exchanged with the first heating medium in the first heating medium flow path 10b extending from the high-temperature heat storage tank 36 to the low-temperature heat storage tank 38. Specifically, utilizing the first heating medium at a high temperature in the high-temperature heat storage tank 36 to increase the temperature of the compressed air before the expansion by the expander 24 improves power generation efficiency (expansion efficiency). That is, in the second heat exchanger 28, the temperature of the compressed air rises and the temperature of the first heating medium decreases. The second heat exchanger 28 is fluidly connected to the low-temperature heat storage tank 38 through the first heating medium flow path 10b, and the first heating medium reduced in temperature is supplied to the low-temperature heat storage tank 38 through the first heating medium flow path 10b to be stored.

The low-temperature heat storage tank 38 stores the first heating medium at a low temperature supplied from the second heat exchanger 28. The low-temperature heat storage tank 38 is fluidly connected to the first heat exchanger 26 through the first heating medium flow path 10a, and the first heating medium stored in the low-temperature heat storage tank 38 is supplied to the first heat exchanger 26 through the first heating medium flow path 10a. The low-temperature heat storage tank 38 is provided with a temperature sensor (temperature detector) 42a for detecting the temperature of the first heating medium inside, and the temperature of the first heating medium to be supplied to the first heat exchanger 26 can be detected. The temperature detected here is output to a control device 44 to be described below.

A fourth heat exchanger 40a as a cooler for the first heating medium is interposed in the first heating medium flow path 10a extending from the low-temperature heat storage tank 38 to the first heat exchanger 26. In the fourth heat exchanger 40a, the first heating medium is cooled and the second heating medium is heated by heat exchange between the first heating medium and the second heating medium.

As described above, in the first heating medium flow paths 10a and 10b, the first heating medium circulates. The circulation of the first heating medium is performed by a pump 46a interposed in the first heating medium flow path 10a. In the present embodiment, the pump 46a is provided downstream of the low-temperature heat storage tank 38, but its position is not particularly limited.

(Lubricating Oil Flow Path)

The lubricating oil flow paths 12a and 12b are provided with a compressor 18, a lubricating oil tank 48, and a fourth heat exchanger 40b in this order. Lubricating oil circulates and flows between these. In addition, known types of lubricating oils can be used, and the type of lubricating oil is not particularly limited.

The lubricating oil tank 48 stores lubricating oil. The lubricating oil tank 48 is fluidly connected to the compressor 18 through the lubricating oil flow path 12a, and the lubricating oil stored in the lubricating oil tank 48 is supplied to the compressor 18 through the lubricating oil flow path 12a. The compressor 18 of the present embodiment is of an oil-free type, but includes components requiring lubricating oil such as bearings inside. Lubricating oil is supplied to these bearings and other components requiring lubricating oil to be used. Alternatively, the compressor 18 itself may be of an oil-cooled type, and may be of a type for directly supplying lubricating oil to the compressor main body.

In addition, the lubricating oil tank 48 is provided with a temperature sensor (temperature detector) 42b for detecting the temperature of the lubricating oil inside, and the temperature of the lubricating oil to be supplied to the compressor 18 can be detected. The temperature detected here is output to a control device 44 to be described below.

The fourth heat exchanger 40b is interposed in the lubricating oil flow path 12a extending from the lubricating oil tank 48 to the compressor 18 as a cooler for lubricating oil. In the fourth heat exchanger 40b, the lubricating oil is cooled and the second heating medium is heated by heat exchange between the lubricating oil and the second heating medium.

In the compressor 18, friction elements such as internal bearings are lubricated and cooled by lubricating oil at a low temperature supplied through the lubricating oil flow path 12a. Here, the lubricating oil used for lubrication and cooling receives the warm heat in the friction elements to rise in temperature. The compressor 18 is fluidly connected to the lubricating oil tank 48 through the lubricating oil flow path 12b, and the lubricating oil raised in temperature in the compressor 18 is supplied to the lubricating oil tank 48 through the lubricating oil flow path 12b.

As described above, the lubricating oil circulates in the lubricating oil flow paths 12a and 12b. The circulation of the lubricating oil is performed by the pump 46b interposed in the lubricating oil flow path 12a. In the present embodiment, the pump 46b is provided downstream of the lubricating oil tank 48, but the position of the pump 46b is not particularly limited.

(Second Heating Medium Flow Path)

The second heating medium flow paths 14a and 14b are provided with a third heat exchanger 30, a low-temperature cold energy storage tank (first cold energy storage) 50, fourth heat exchangers 40a and 40b, and a high-temperature cold energy storage tank (second cold energy storage) 52 in this order. The second heating medium circulates and flows between these. The type of the second heating medium is not particularly limited, and for example, a glycol-based heating medium may be used.

In the third heat exchanger 30, the air in the air flow path 8f extending from the exhaust port 24b of the expander 24 is heat-exchanged with the second heating medium in the second heating medium flow path 14a extending from the high-temperature cold energy storage tank 52 to the low-temperature cold energy storage tank 50. Specifically, the compressed air flowing in the air flow path 8f is at a low temperature due to expansion heat absorption during expansion in the expander 24, and cold energy is recovered into a second refrigerant by heat exchange in the third heat exchanger 30. That is, in the second heat exchanger 28, the temperature of the exhausted air rises and the temperature of the second heating medium decreases. The third heat exchanger 30 is fluidly connected to the low-temperature cold energy storage tank 50 through the second heating medium flow path 14a, and the second heating medium whose temperature is decreased is supplied to the low-temperature cold energy storage tank 50 to be stored.

The low-temperature cold energy storage tank 50 keeps the second heating medium at a low temperature supplied from the third heat exchanger 30 cool to store the second heating medium. Therefore, it is preferable that the low-temperature cold energy storage tank 50 is thermally insulated. The low-temperature cold energy storage tank 50 is fluidly connected to the fourth heat exchangers 40a and 40b through the second heating medium flow path 14b, and the second heating medium stored in the low-temperature cold energy storage tank 50 is supplied to the fourth heat exchangers 40a and 40b through the second heating medium flow path 14b.

A valve 32e is provided downstream of the low-temperature cold energy storage tank 50 in the second heating medium flow path 14b, and opening or closing the valve 32e allows supply of the second heating medium from the low-temperature cold energy storage tank 50 to the fourth heat exchangers 40a and 40b to be permitted or blocked. The valve 32e of the present embodiment is included in the switching unit of the present invention. It should be noted that it is also possible to supply the second heating medium from the low-temperature cold energy storage tank 50 to only any one of the fourth heat exchangers 40a and 40b.

In the one fourth heat exchanger 40a, the first heating medium in the first heating medium flow path 10a extending from the low-temperature heat storage tank 38 to the first heat exchanger 26 and the second heating medium in the second heating medium flow path 14b extending from the low-temperature cold energy storage tank 50 to the high-temperature cold energy storage tank 52 are heat-exchanged with each other. Specifically, the second heating medium at a low temperature in the low-temperature cold energy storage tank 50 is used to lower the temperature of the first heating medium to be supplied to the first heat exchanger 26. That is, in the fourth heat exchanger 40a, the temperature of the first heating medium decreases and the temperature of the second heating medium rises. The fourth heat exchanger 40a is fluidly connected to the high-temperature cold energy storage tank 52 through the second heating medium flow path 14b, and the second heating medium increased in temperature is supplied to the high-temperature cold energy storage tank 52 through the second heating medium flow path 14b to be stored.

In the other fourth heat exchanger 40b, the lubricating oil in the lubricating oil flow path 12a extending from the lubricating oil tank 48 to the compressor 18 and the second heating medium in the second heating medium flow path 14b extending from the low-temperature cold energy storage tank 50 to the high-temperature cold energy storage tank 52 are heat-exchanged with each other. Specifically, the second heating medium at a low temperature in the low-temperature cold energy storage tank 50 is used to lower the temperature of the lubricating oil to be supplied to the compressor 18. That is, in the fourth heat exchanger 40b, the temperature of the lubricating oil decreases and the temperature of the second heating medium rises. The fourth heat exchanger 40b is fluidly connected to the high-temperature cold energy storage tank 52 through the second heating medium flow path 14b, and the second heating medium increased in temperature is supplied to the high-temperature cold energy storage tank 52 through the second heating medium flow path 14b to be stored.

The high-temperature cold energy storage tank 52 stores the second heating medium at a high temperature supplied from the fourth heat exchangers 40a and 40b. The high-temperature cold energy storage tank 52 is fluidly connected to the third heat exchanger 30 through the second heating medium flow path 14a, and the second heating medium stored in the high-temperature cold energy storage tank 52 is supplied to the third heat exchanger 30 through the second heating medium flow path 14a.

As described above, in the second heating medium flow paths 14a and 14b, the second heating medium circulates. The circulation of the second heating medium is performed by a pump 46c interposed in the second heating medium flow path 14a. In the present embodiment, the pump 46c is provided downstream of the high-temperature cold energy storage tank 52, but its position is not particularly limited.

As described above, with the four flow path configurations including the air flow paths 8a to 8f, the first heating medium flow paths 10a and 10b, the lubricating oil flow paths 12a and 12b, and the second heating medium flow paths 14a and 14b, the cold energy of the air exhausted from the expander 24 is recovered by the third heat exchanger 30 and stored in the low-temperature cold energy storage tank 50, and with the cold energy, the compressed air after compression and the lubricating oil supplied to the compressor 18 can be cooled by the fourth heat exchangers 40a and 40b.

(Control Method)

The CAES power generation device 2 includes a control device 44. The control device 44 receives the temperature value T1 of the first heating medium in the low-temperature heat storage tank 38 or the temperature value T2 of the lubricating oil in the lubricating oil tank 48 measured by the temperature sensor 42a or 42b, and controls the switching unit based on the temperature value T1 or T2.

Figure 2:
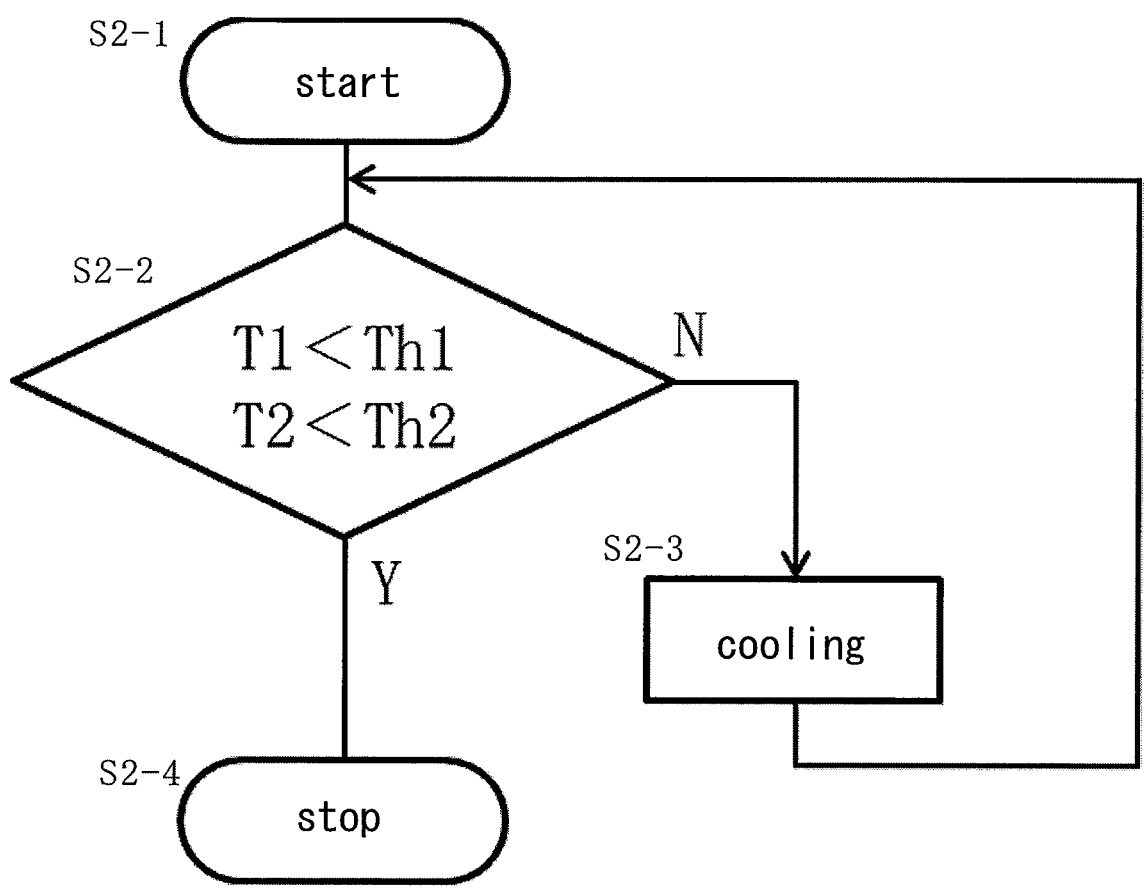
FIG. 2 is a flowchart showing a control method of the compressed air energy storage power generation device in FIG. 1.

As shown in FIG. 2, when starting the control operation (step S2-1), the control device 44 determines whether or not the temperature values T1 and T2 are respectively less than the set values Th1 and Th2 (step S2-2). If the temperature values T1 and T2 are respectively not less than the set values Th1 and Th2, cooling treatment to be described below is executed (step S2-3). If the temperature values T1 and T2 are respectively less than the set values Th1 and Th2, the control operation is ended (step S2-4). In the present embodiment, the temperature values T1 and T2 are continuously detected, and these control operations are continuously executed.

In the cooling treatment in step S2-3, first, the valve 32a is opened and the valve 32b is closed. Thus, since the compressed air to be expanded by the expander 24 is not heated before expansion, the temperature of the air exhausted from the exhaust port 24b after expansion is lowered. Furthermore, the valve 32d is opened and the valve 32c is closed. Thus, the third heat exchanger 30 recovers the cold energy of the air into the second heating medium. Furthermore, the valve 32e is opened. Thus, the cooled second heating medium is supplied to the fourth heat exchangers 40a and 40b, and each of the first heating medium and the lubricating oil whose respective temperatures are not less than the set values Th1 and Th2 is cooled. At this time, if it is detected that only any one of the temperature value T1 of the first heating medium and the temperature value T2 of the lubricating oil is not less than the set values Th1 and Th2, the cooled second heating medium is supplied to only one of the fourth heat exchangers 40a and 40b, and only the corresponding one is cooled.

(Action and Effect)

According to the above configuration, since the cold energy of the air exhausted from the expander 24 is used as the cold energy source, an external cooling device such as a cooling tower is not needed, the CAES power generation device 2 can be installed independently of the outside, and the degree of freedom of the installation location is not limited. In addition, since the cold energy generated in the system is used, the energy efficiency of the system can be improved.

In addition, since the low-temperature cold energy storage tank 50 is provided, even when it is unable to recover the cold energy to obtain the cooled second heating medium, the cooled second heating medium stored in the low-temperature cold energy storage tank 50 is supplied to the fourth heat exchangers 40a and 40b, and the compressor 18 and the compressed air discharged from the compressor can be cooled.

In addition, since the low-temperature heat storage tank 38 and the high-temperature heat storage tank 36 are provided, it is able to store the first heating medium and the second heating medium separately for each temperature, and the first heating medium at a higher temperature and the second heating medium at a lower temperature can be obtained.

Since the temperatures of the lubricating oil and the first heating medium are detected by the temperature sensors 42a and 42b, and the switching unit is controlled based on the detected temperature, the lubricating oil and the first heating medium can be adjusted to respective temperature set values suitable for operation of the CAES power generation device 2. Therefore, the temperature of the lubricating oil important for the operation of the compressor 18 and the temperature of the compressed air discharged from the compressor 18 that cools by utilizing the first heating medium can be adjusted to a temperature suitable for operation.

Second Embodiment

Figure 3:
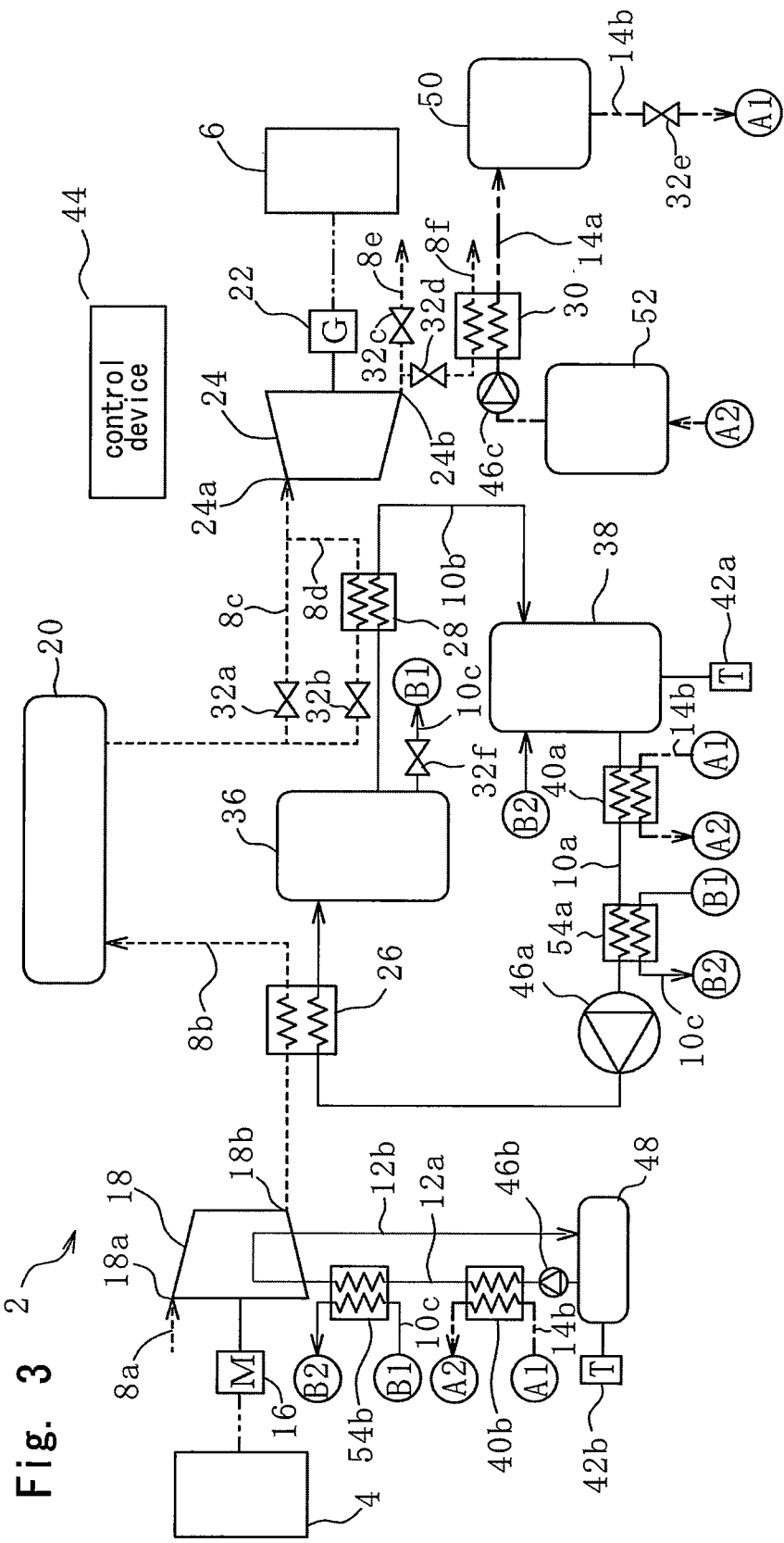
FIG. 3 is a schematic configuration diagram of a compressed air energy storage power generation device according to a second embodiment of the present invention.

In the CAES power generation device 2 of the second embodiment shown in FIG. 3, fifth heat exchangers 54a and 54b are provided. The present embodiment is substantially the same as the first embodiment in FIG. 1 except for this point. Therefore, description of parts similar to the configuration shown in FIG. 1 will be omitted.

In the present embodiment, the fifth heat exchanger 54a for heating the first heating medium to be supplied to the first heat exchanger 26 and the fifth heat exchanger 54b for heating the lubricating oil to be supplied to the compressor 18 are provided. The fifth heat exchangers 54a and 54b are interposed in a first heating medium flow path 10c extending from the high-temperature heat storage tank 36 to the low-temperature heat storage tank 38. A valve 32f is provided in the first heating medium flow path 10c, and opening or closing the valve 32f allows the supply of the first heating medium from the high-temperature heat storage tank 36 to the fifth heat exchangers 54a and 54b to be permitted or blocked. The valve 32f of the present embodiment is included in the switching unit of the present invention. It should be noted that it is also possible to supply the first heating medium from the high-temperature heat storage tank 36 to only any one of the fifth heat exchangers 54a and 54b.

In the one fifth heat exchanger 54a, the first heating medium in the first heating medium flow path 10a extending from the low-temperature heat storage tank 38 to the first heat exchanger 26 and the first heating medium in the first heating medium flow path 10c extending from the high-temperature heat storage tank 36 to the low-temperature heat storage tank 38 are heat-exchanged with each other. Specifically, the first heating medium at a high temperature in the high-temperature heat storage tank 36 is used to increase the temperature of the first heating medium to be supplied to the first heat exchanger 26. That is, in the fifth heat exchanger 54a, heat exchange is performed between the first heating mediums. The first heating medium reduced in temperature is supplied to the low-temperature heat storage tank 38 through the first heating medium flow path 10c to be stored.

In the other fifth heat exchanger 54b, the lubricating oil in the lubricating oil flow path 12a extending from the lubricating oil tank 48 to the compressor 18 and the first heating medium in the first heating medium flow path 10c extending from the high-temperature heat storage tank 36 to the low-temperature heat storage tank 38 are heat-exchanged with each other. Specifically, the first heating medium at a high temperature in the high-temperature heat storage tank 36 is used to raise the temperature of the lubricating oil to be supplied to the compressor 18. That is, in the fifth heat exchanger 54b, the temperature of the lubricating oil rises and the temperature of the first heating medium decreases. The first heating medium reduced in temperature is supplied to the low-temperature heat storage tank 38 through the first heating medium flow path 10c to be stored.

Figure 4:
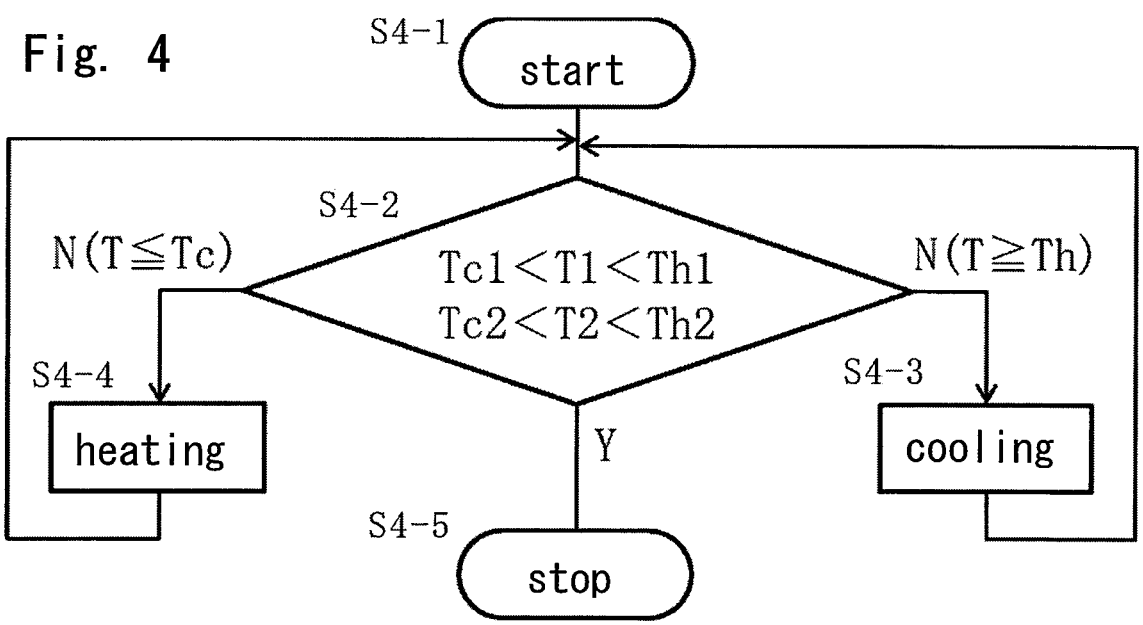
FIG. 4 is a flowchart showing a control method of the compressed air energy storage power generation device in FIG. 3.

As shown in FIG. 4, when starting the control operation (step S4-1), the control device 44 of the present embodiment determines whether or not the temperature values T1 and T2 are respectively within the range of the lower limit set values Tc1 and Tc2 to the upper limit set values Th1 and Th2 (step S4-2). If the temperature values T1 and T2 are respectively not less than the set values Th1 and Th2, cooling treatment is executed in the same manner as in the first embodiment (step S4-3). If the temperature values T1 and T2 are respectively not more than the set values Tc1 and Tc2, heating treatment to be described below is executed (step S4-4). If the temperature values T1 and T2 are respectively within the range of the set values Tc1 and Tc2 to the set values Th1 and Th2, the control operation is ended (step S4-5). In the present embodiment, the temperature values T1 and T2 are continuously detected, and these control operations are continuously executed.

In the heating treatment in step S4-5, the valve 32f is opened. Thus, the heated first heating medium is supplied to the fifth heat exchangers 54a and 54b, and each of the first heating medium and the lubricating oil whose respective temperatures are detected to be not more than the set values Tc1 and Tc2 is heated. At this time, if it is detected that only any one of the temperature value T1 of the first heating medium and the temperature value T2 of the lubricating oil is not more than the set values Tc1 and Tc2, the heated first heating medium is supplied to only one of the fifth heat exchangers 54a and 54b, and only the corresponding one is heated.

Thus, in the present embodiment, since the temperatures of the first heating medium supplied from the low-temperature heat storage tank 38 to the first heat exchanger 26 and the lubricating oil supplied from the lubricating oil tank 48 to the compressor 18 are adjusted not only by cooling but also by heating, the first heating medium and the lubricating oil can be more reliably adjusted to temperatures optimum for operation.

Third Embodiment

Figure 5:
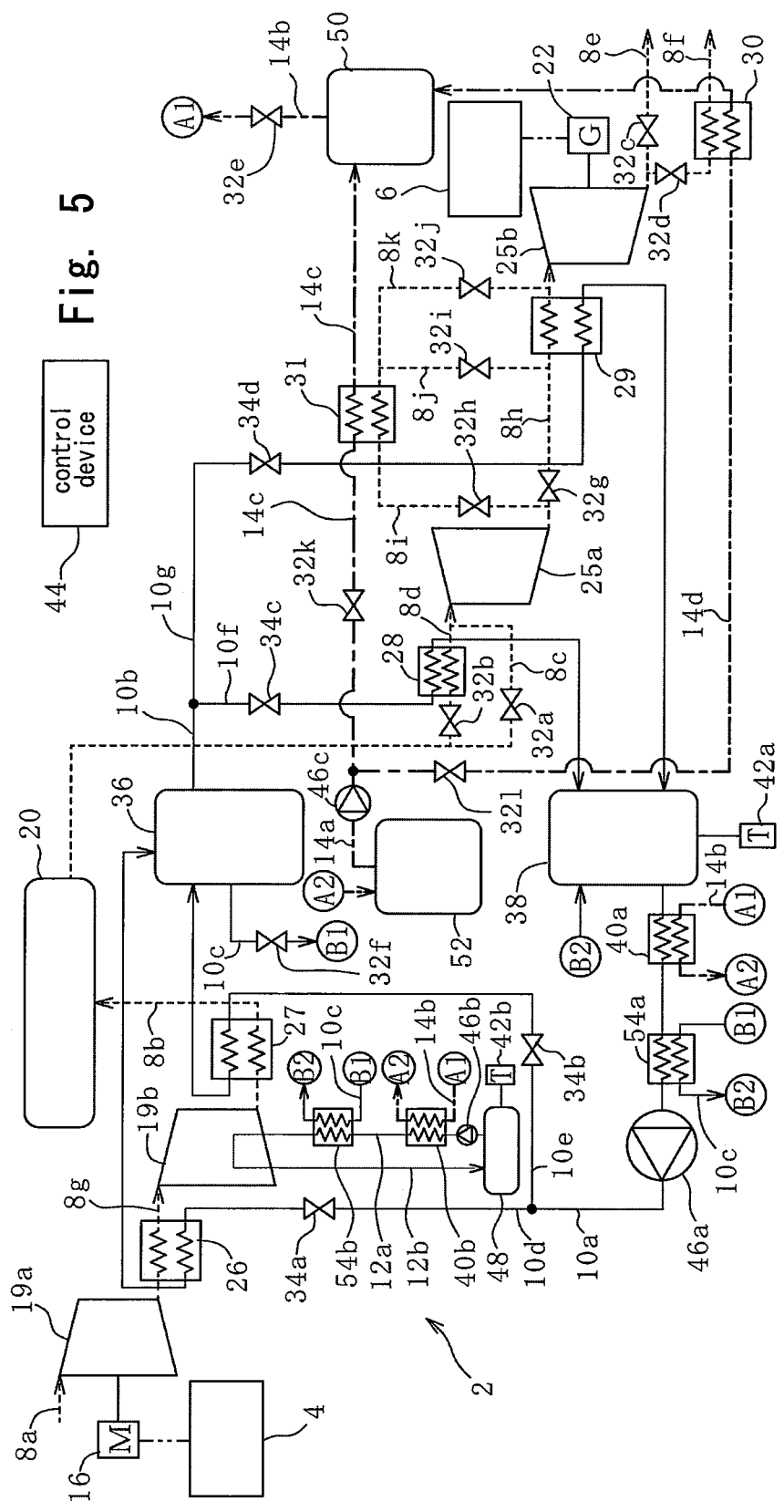
FIG. 5 is a schematic configuration diagram of a compressed air energy storage power generation device according to a third embodiment of the present invention.

In the CAES power generation device 2 of the third embodiment shown in FIG. 5, both the compressor 18 and the expander 24 are of two-stage types. The present embodiment is substantially the same as the second embodiment in FIG. 3 except for these points. Therefore, description of parts similar to the configuration shown in FIG. 3 will be omitted.

In the present embodiment, the compressor 18 is of a two-stage type, and includes a first-stage compressor main body 19a, and a second-stage compressor main body 19b for further compressing the air after compression in the first-stage compressor main body 19a. In the present embodiment, the first-stage compressor main body 19a and the second-stage compressor main body 19b are driven by a single motor 16 via a gear (not shown).

Two first heat exchangers 26 and 27 are provided in order to cool the compressed air discharged from each of the first-stage compressor main body 19a and the second-stage compressor main body 19b. Therefore, the first heating medium flow path 10a extending from the low-temperature heat storage tank 38 to the high-temperature heat storage tank 36 branches into first heating medium flow paths 10d and 10e so as to supply the first heating medium to each of the two first heat exchangers 26 and 27. Valves 34a and 34b for permitting or blocking the flow of the first heating medium are interposed in the first heating medium flow paths 10d and 10e.

In the present embodiment, the lubricating oil cooled by the fourth heat exchanger 40b is supplied to the intermediate stage of the compressor. In addition, in the first heat exchangers 26 and 27, the compressed air after compression in the first-stage compressor main body 19a and before compression in the second-stage compressor main body 19b and the compressed air after compression in the second-stage compressor main body 19b are respectively cooled. In particular, the first heat exchanger 26 is provided to cool the intermediate air of the compressed air.

Here, the intermediate stage of the compressor 18 indicates the compressor main body other than the first stage out of a plurality of stages of compressor main bodies 19a and 19b, that is, indicates the compressor main body from the second stage to the last stage, and in the present embodiment, indicates the second stage compressor main body 19b. In addition, the intermediate air of the compressor 18 indicates compressed air after the first stage compression and before the last stage compression. That is, in the present embodiment, the intermediate air of the compressor 18 indicates the compressed air in the air flow path 8g between the first-stage compressor main body 19a and the second-stage compressor main body 19b. Since the temperatures of the intermediate stage and the intermediate air of the compressor 18 rise due to the compression heat when the air is compressed in the preceding stage, cooling the intermediate stage and the intermediate air allows the compression efficiency to be improved.

The expander 24 is of a two-stage type and includes a first-stage expander main body 25a and a second-stage expander main body 25b for further expanding the air after expansion in the first-stage expander main body 25a. In the present embodiment, one generator 22 is driven by a first-stage expander main body 25a and a second-stage expander main body 25b via a gear (not shown).

Two second heat exchangers 28 and 29 are provided to heat the compressed air to be supplied to each of the first-stage expander main body 25a and the second-stage expander main body 25b. Therefore, the first heating medium flow path 10b extending from the high-temperature heat storage tank 36 to the low-temperature heat storage tank 38 branches into the first heating medium flow paths 10f and 10g so as to supply the first heating medium to each of the two second heat exchangers 28 and 29. Valves 34c and 34d for permitting or blocking the flow of the first heating medium are interposed in the first heating medium flow paths 10f and 10g.

In addition, two third heating exchangers 30 and 31 are provided in order to recover cold energy from the air exhausted from each of the first stage expander main body 25a and the second stage expander main body 25b. Therefore, the second heating medium flow path 14a extending from the high-temperature cold energy storage tank 52 to the low-temperature cold energy storage tank 50 branches into the second heating medium flow path 14c and 14d so as to supply the second heating medium to each of the two third heat exchanger 30 and 31. Valves 32k and 32l for permitting or blocking the flow of the second heating medium are interposed in the second heating medium flow paths 14c and 14d. The valves 32k and 32l of the present embodiment are included in the switching unit of the present invention.

The first-stage expander main body 25a is fluidly connected to the second-stage expander main body 25b through the air flow paths 8h to 8k, and the compressed air exhausted from the first-stage expander main body 25a is supplied to the second-stage expander main body 25b through the air flow paths 8h to 8k. Valves 32g to 32j are respectively provided in the air flow paths 8h to 8k, and opening or closing the valves 32g to 32j permits or blocks the supply of the compressed air from the first-stage expander main body 25a to the second-stage expander main body 25b and allows which of the air flow paths 8h to 8k the compressed air flows through to be selected.

The second heat exchanger 29 and the third heat exchanger 31 are respectively interposed in the air flow paths 8h and 8i. In the second heat exchanger 29, the compressed air is heated and the first heating medium is cooled by heat exchange between the first heating medium and the compressed air. In the third heat exchanger 31, the compressed air is heated and the second heating medium is cooled by heat exchange between the second heating medium and the compressed air. The second heating medium cooled here is supplied to the low-temperature cold energy storage tank 50 to be stored.

In the present embodiment, since the air flow paths 8c to 8f and 8h to 8k through which the compressed air flows can be selected, cooling and heating can be efficiently executed. For example, when the cooling treatment as shown in FIG. 4 is executed, first, the valve 32a is opened and the valve 32b is closed. Thus, the compressed air to be expanded by the first-stage expander main body 25a is not heated before expansion, and the temperature of the air to be exhausted after expansion in the first-stage expander main body 25a is lowered. Furthermore, the valves 32h, 32j, and 32k are opened and the valves 32g and 32i are closed. Thus, the cold energy of the air is recovered to the second heating medium by the third heat exchanger 31, and at the same time, the air is heated before expansion in the second-stage expander main body 25b. Furthermore, the valves 32d and 32l are opened and the valve 32c is closed. Thus, the third heat exchanger 30 further recovers the cold energy of the air into the second heating medium. Furthermore, the valve 32e is opened. Thus, the cooled second heating medium is supplied to the fourth heat exchangers 40a and 40b, and each of the first heating medium and the lubricating oil whose respective temperatures are not less than the set values Th1 and Th2 is cooled. Thus, executing the cooling treatment allows the second heating medium to be cooled by the two third heat exchangers 30 and 31, and therefore, more cooled second heating medium to be obtained, and the first heating medium and the lubricating oil to be more reliably cooled by the fourth heat exchangers 40a and 40b. However, the method of executing the cooling treatment is not limited to this. Any of the air flow paths 8c to 8f and 8h to 8k may be selected as long as the second heating medium can be cooled by the third heat exchanger 30 or 31.

The case of executing the heating treatment as shown in FIG. 4 is the same as in the second embodiment.

First Modified Example of Third Embodiment

Figure 6:
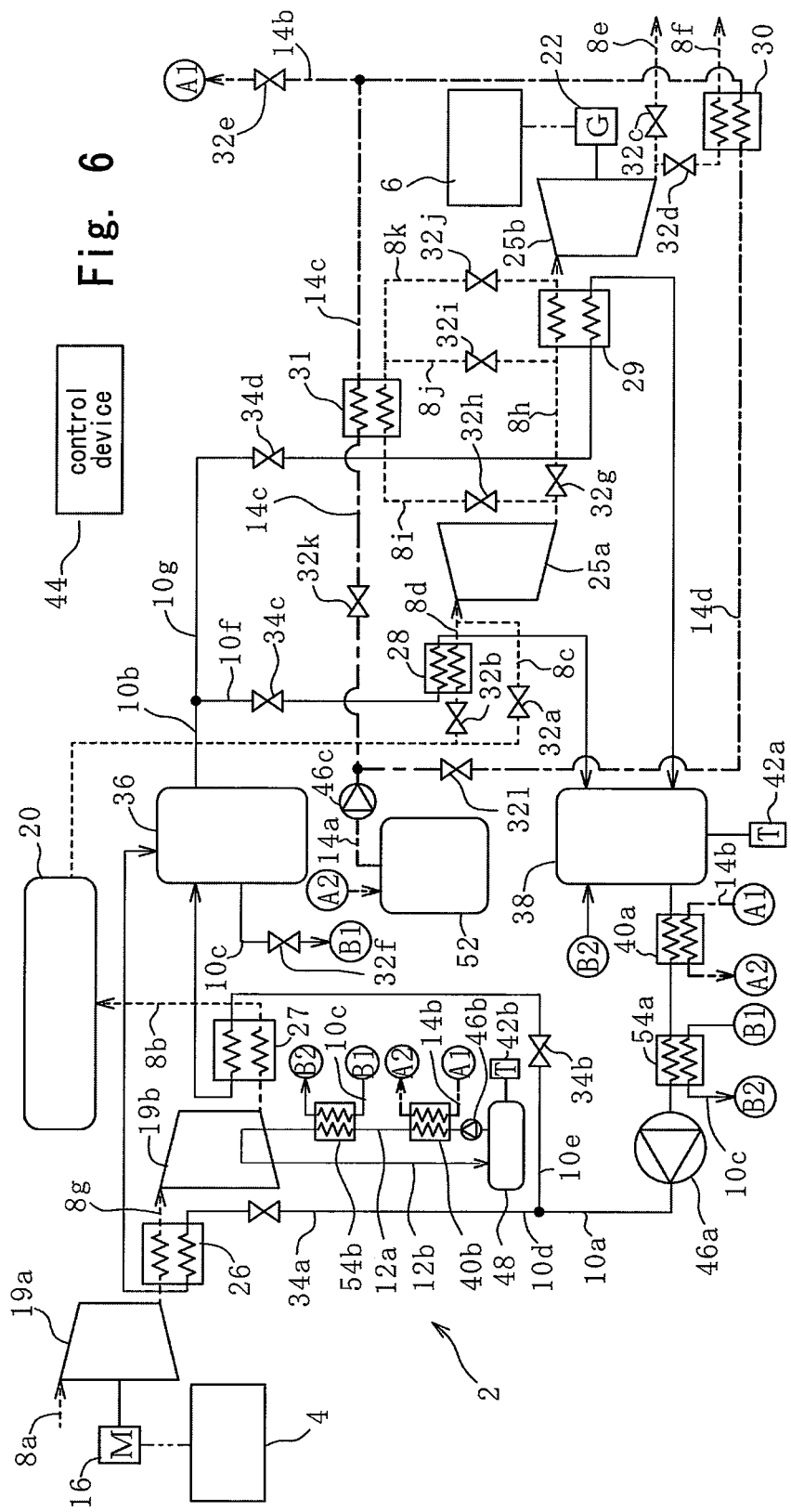
FIG. 6 is a schematic configuration diagram showing a first modified example of the compressed air energy storage power generation device in FIG. 5.

As shown in FIG. 6, in the present modified example, the low-temperature cold energy storage tank 50 is omitted from the CAES power generation device 2 of the third embodiment shown in FIG. 5. When the low-temperature cold energy storage tank 50 is omitted, since the cooled second heating medium cannot be stored, the second heating medium whose cold energy is recovered by the third heat exchangers 30 and 31 is directly supplied to the fourth heat exchangers 40a and 40b.

Thus, even when the low-temperature cold energy storage tank 50 is omitted, as long as it is in a state where cold energy recovery is possible, the first heating medium to be supplied from the inside of the low-temperature heat storage tank 38 to the first heat exchangers 26 and 27 and the lubricating oil to be supplied from the lubricating oil tank 48 to the compressor 18 are temperature-adjustable. In particular, omitting the low-temperature cold energy storage tank 50 allows miniaturization and cost reduction to be achieved.

Second Modified Example of Third Embodiment

Figure 7:
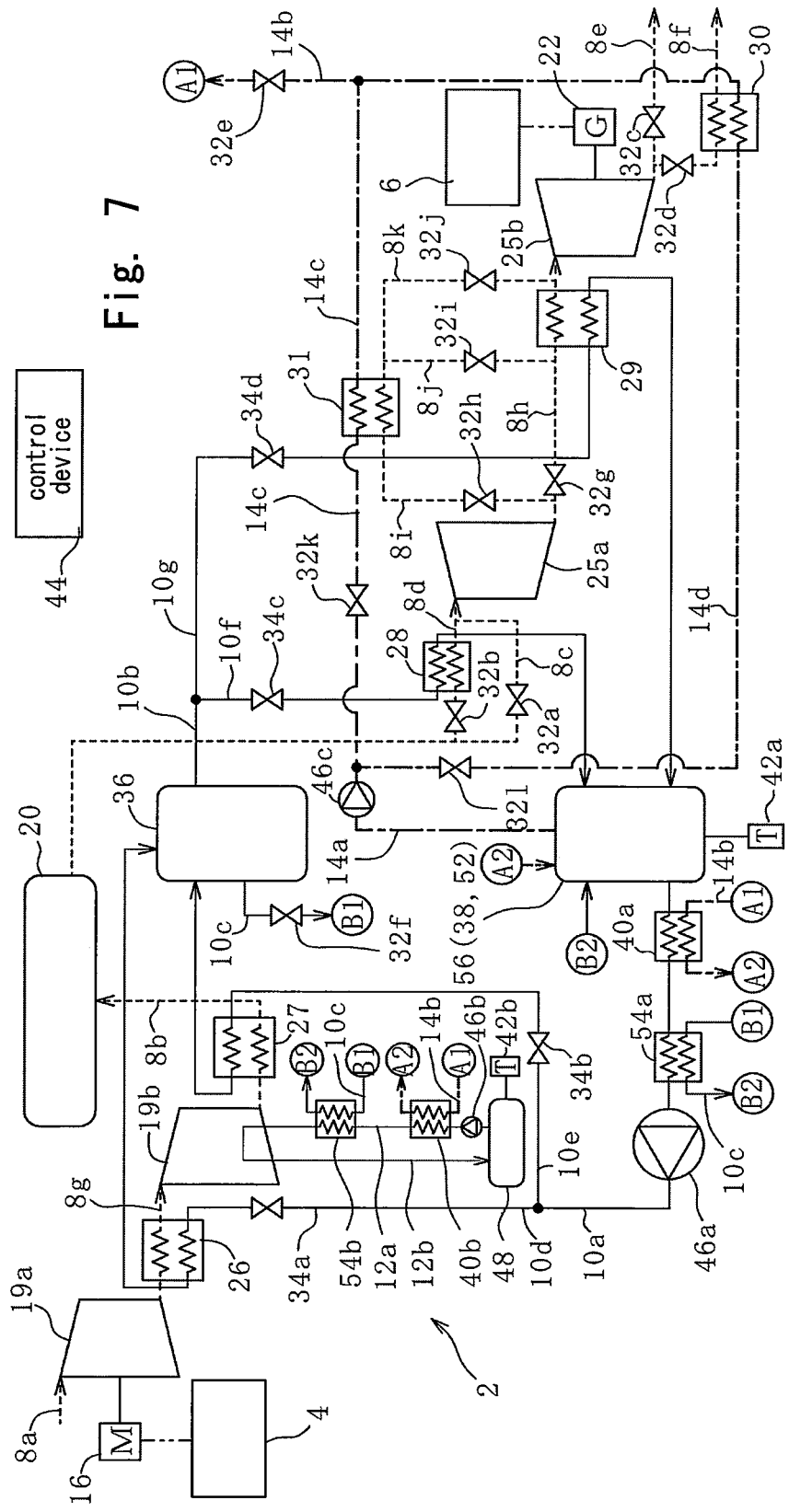
FIG. 7 is a schematic configuration diagram showing a second modified example of the compressed air energy storage power generation device in FIG. 5.
Figure 8:
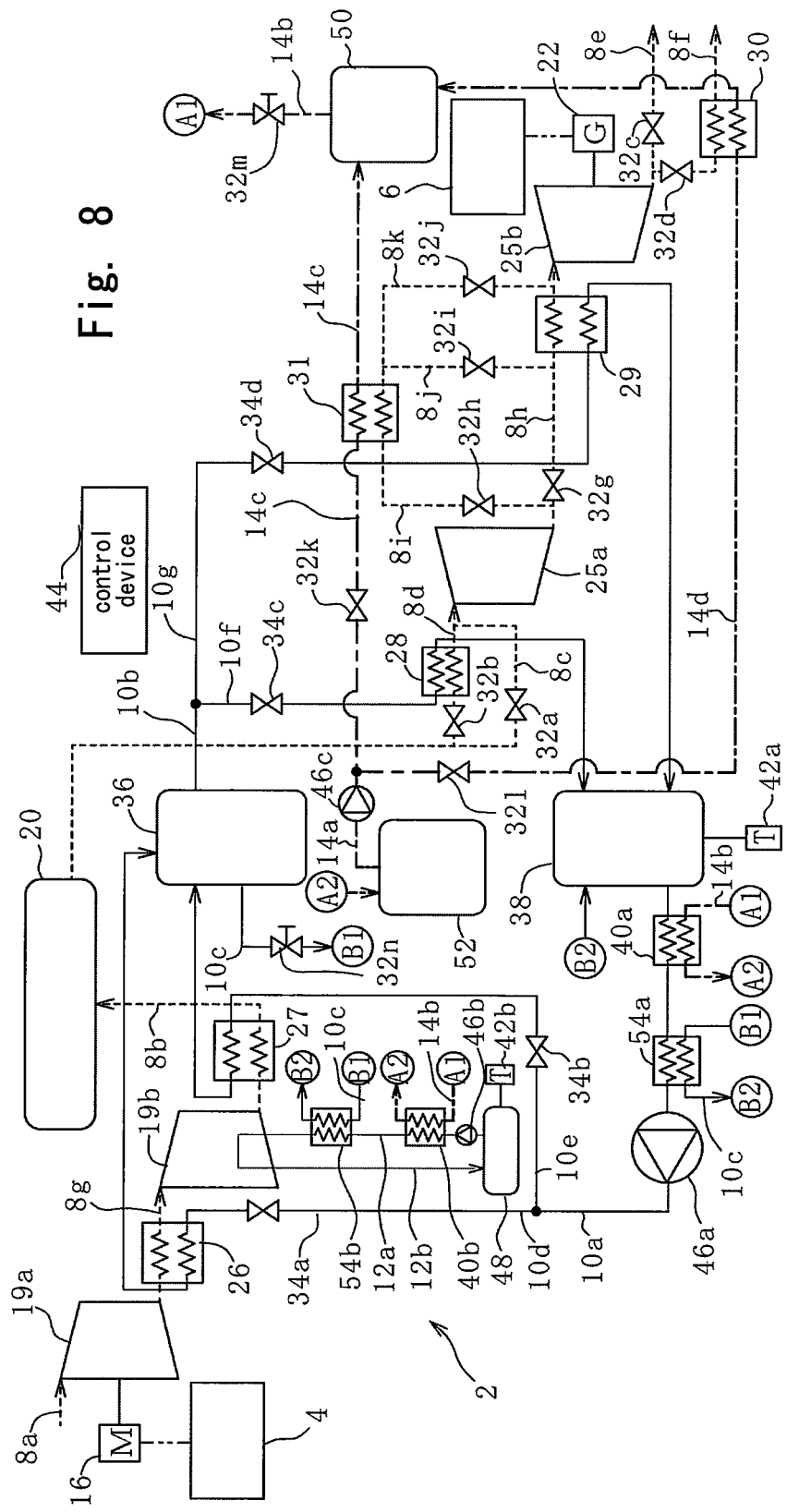
FIG. 8 is a schematic configuration diagram showing a third modified example of the compressed air energy storage power generation device in FIG. 5.

As shown in FIG. 7, in the present modified example, the high-temperature cold energy storage tank 52 and the low-temperature heat storage tank 38 are further integrated into a single heating medium accumulator 56 from the first modified example of the CAES power generation device 2 of the third embodiment shown in FIG. 6.

In the present modified example, the first heating medium and the second heating medium are the same heating medium, and these heating mediums can be mixed to be used. Therefore, the flow paths of the first heating medium and the second heating medium do not need to be separated, and the high-temperature cold energy storage tank 52 and the low-temperature heat storage tank 38 can be integrated into one heating medium accumulator 56. Therefore, a tank for storing the heating medium can be further omitted, whereby miniaturization and cost reduction can be achieved.

Third Modified Example of Third Embodiment

As shown in FIG. 7, in the present modified example, the valves 32e and 32f of the CAES power generation device 2 of the third embodiment shown in FIG. 5 are replaced with flow control valves 32m and 32n.

The flow control valves 32m and 32n can optimize the amounts of the second heating medium and the first heating medium to be supplied for cooling and heating the first heating medium and the lubricating oil. Specifically, regarding cooling, when the temperature value T1 of the first heating medium or the temperature value T2 of the lubricating oil detected by the temperature sensor 42a or 42b is significantly higher than the upper limit set value Th1 or Th2, and the lubricating oil or the first heating medium needs to be cooled more largely in the fourth heat exchanger 40a or 40b, the degree of opening of the flow control valve 32m is increased and the flow rate of the second heating medium is increased. Thus, the amount of heat exchange in the fourth heat exchangers 40a and 40b increases, and the first heating medium and the lubricating oil can be more largely cooled. On the other hand, when the temperature value T1 of the first heating medium or the temperature value T2 of the lubricating oil detected by the temperature sensor 42a or 42b is not so high as compared with the set value Th1 or Th2, and the first heating medium or the lubricating oil does not need to be cooled so much in the fourth heat exchangers 40a or 40b, the degree of opening of the flow control valve 32m is reduced and the flow rate of the second heating medium is decreased. Thus, the amount of heat exchange decreases, and the amount of the second heating medium used for cooling the first heating medium or the lubricating oil can be reduced.

As described above, although the specific embodiments of the present invention and its modified examples are described, the present invention is not limited to the above-described embodiments, and various modifications can be made within the scope of the present invention. For example, an appropriate combination of contents of the individual embodiments may be one embodiment of the present invention. In addition, in the individual embodiments described above, the air is taken as an example of compression objects, but fluid other than air may be used, and the object is not particularly limited.

The invention claimed is:
1. A compressed air energy storage power generation device comprising:
an electric motor to be driven by electric power generated by renewable energy;
a compressor configured to be driven by the electric motor and to compress air;
a pressure accumulator configured to store compressed air compressed by the compressor;
an expander to be driven by the compressed air to be supplied from the pressure accumulator;
a generator mechanically connected to the expander;
a first heat exchanger configured to perform heat exchange between the compressed air to be supplied from the compressor to the pressure accumulator and a first heating medium to cool the compressed air and to heat the first heating medium;
a first heat storage configured to store the first heating medium heated by the first heat exchanger;
a second heat exchanger configured to perform heat exchange between the compressed air to be supplied from the pressure accumulator to the expander and the first heating medium to be supplied from the first heat storage to heat the compressed air and to cool the first heating medium;
a third heat exchanger configured to perform heat exchange between air exhausted from the expander and a second heating medium to heat the air and to cool the second heating medium; and
a fourth heat exchanger configured to perform heat exchange between the second heating medium cooled by the third heat exchanger and at least one of lubricating oil to be supplied to the compressor and the first heating medium to be supplied to the first heat exchanger to heat the second heating medium and to cool the lubricating oil and/or the first heating medium.

2. The compressed air energy storage power generation device according to claim 1, further comprising a first cold energy storage configured to store the second heating medium cooled by the third heat exchanger.

3. The compressed air energy storage power generation device according to claim 1, further comprising:
a second heat storage configured to store the first heating medium cooled by the second heat exchanger, and
a second cold energy storage configured to store the second heating medium heated by the fourth heat exchanger.

4. The compressed air energy storage power generation device according to claim 3, wherein
the first heating medium and the second heating medium are identical heating mediums, and
the second heat storage and the second cold energy storage are one heating medium accumulator.

5. The compressed air energy storage power generation device according to claim 1, wherein
the compressor is of a multi-stage type configured to compress air in a plurality of stages,
the lubricating oil cooled by the fourth heat exchanger is supplied to an intermediate stage of the compressor, and
the first heat exchanger is provided to cool intermediate air of the compressed air.

6. The compressed air energy storage power generation device according to claim 1, further comprising:
a temperature detector configured to detect a temperature of at least one of the lubricating oil to be supplied to the compressor and the first heating medium to be supplied to the first heat exchanger,
a switching unit configured to permit or block a flow of the second heating medium to be supplied to the fourth heat exchanger, and
a control device configured to switch the switching unit to permit a flow of the second heating medium when a temperature value detected by the temperature detector is not less than a set value, and configured to switch the switching unit to block a flow of the second heating medium when the temperature value is less than the set value.

7. The compressed air energy storage power generation device according to claim 6, wherein
the switching unit includes a flow control valve for adjusting a flow rate of the second heating medium to be supplied to the fourth heat exchanger, and
the control device adjusts an opening degree of the flow control valve based on the temperature value detected by the temperature detector.

8. The compressed air energy storage power generation device according to claim 2, wherein
the compressor is of a multi-stage type configured to compress air in a plurality of stages,
the lubricating oil cooled by the fourth heat exchanger is supplied to an intermediate stage of the compressor, and
the first heat exchanger is provided to cool intermediate air of the compressed air.

9. The compressed air energy storage power generation device according to claim 3, wherein
the compressor is of a multi-stage type configured to compress air in a plurality of stages,
the lubricating oil cooled by the fourth heat exchanger is supplied to an intermediate stage of the compressor, and
the first heat exchanger is provided to cool intermediate air of the compressed air.

10. The compressed air energy storage power generation device according to claim 4, wherein
the compressor is of a multi-stage type configured to compress air in a plurality of stages,
the lubricating oil cooled by the fourth heat exchanger is supplied to an intermediate stage of the compressor, and
the first heat exchanger is provided to cool intermediate air of the compressed air.

11. The compressed air energy storage power generation device according to claim 2, further comprising:
a temperature detector configured to detect a temperature of at least one of the lubricating oil to be supplied to the compressor and the first heating medium to be supplied to the first heat exchanger,
a switching unit configured to permit or block a flow of the second heating medium to be supplied to the fourth heat exchanger, and
a control device configured to switch the switching unit to permit a flow of the second heating medium when a temperature value detected by the temperature detector is not less than a set value, and configured to switch the switching unit to block a flow of the second heating medium when the temperature value is less than the set value.

12. The compressed air energy storage power generation device according to claim 3, further comprising:
a temperature detector configured to detect a temperature of at least one of the lubricating oil to be supplied to the compressor and the first heating medium to be supplied to the first heat exchanger,
a switching unit configured to permit or block a flow of the second heating medium to be supplied to the fourth heat exchanger, and
a control device configured to switch the switching unit to permit a flow of the second heating medium when a temperature value detected by the temperature detector is not less than a set value, and configured to switch the switching unit to block a flow of the second heating medium when the temperature value is less than the set value.

13. The compressed air energy storage power generation device according to claim 4, further comprising:
a temperature detector configured to detect a temperature of at least one of the lubricating oil to be supplied to the compressor and the first heating medium to be supplied to the first heat exchanger,
a switching unit configured to permit or block a flow of the second heating medium to be supplied to the fourth heat exchanger, and
a control device configured to switch the switching unit to permit a flow of the second heating medium when a temperature value detected by the temperature detector is not less than a set value, and configured to switch the switching unit to block a flow of the second heating medium when the temperature value is less than the set value.

14. The compressed air energy storage power generation device according to claim 11, wherein
the switching unit includes a flow control valve for adjusting a flow rate of the second heating medium to be supplied to the fourth heat exchanger, and
the control device adjusts an opening degree of the flow control valve based on the temperature value detected by the temperature detector.

15. The compressed air energy storage power generation device according to claim 12, wherein
the switching unit includes a flow control valve for adjusting a flow rate of the second heating medium to be supplied to the fourth heat exchanger, and
the control device adjusts an opening degree of the flow control valve based on the temperature value detected by the temperature detector.

16. The compressed air energy storage power generation device according to claim 13, wherein
the switching unit includes a flow control valve for adjusting a flow rate of the second heating medium to be supplied to the fourth heat exchanger, and
the control device adjusts an opening degree of the flow control valve based on the temperature value detected by the temperature detector.

* * * * *